United States Patent [19]

Giorgetti et al.

[11] Patent Number: 4,569,848

[45] Date of Patent: Feb. 11, 1986

[54] CONFECTIONARY PRODUCT AND PROCESS FOR PRODUCING THE SAME

[75] Inventors: Paolo Giorgetti; Franco Romani; Enrico Strino, all of Perugia, Italy

[73] Assignee: Perugina S.p.A., San Sisto, Italy

[21] Appl. No.: 600,074

[22] Filed: Apr. 13, 1984

[30] Foreign Application Priority Data

Feb. 2, 1984 [IT] Italy ............... 47636 A/84

[51] Int. Cl.$^4$ .............. A21D 13/08; A21D 15/08
[52] U.S. Cl. .................. 426/94; 426/103; 426/281; 426/282; 426/283; 426/284; 426/514; 426/516; 426/517; 426/660; 426/661
[58] Field of Search .......... 426/282, 283, 284, 143, 426/94, 292, 295

[56] References Cited

U.S. PATENT DOCUMENTS

| 2,925,347 | 2/1960 | Cummings et al. | 426/283 |
| 2,960,045 | 11/1960 | Pentzlin | 426/284 |
| 3,480,445 | 11/1969 | Slaybaugh | 426/284 |
| 3,615,675 | 10/1971 | Wisdom et al. | 426/284 |
| 3,894,159 | 7/1975 | Franta | 426/284 |
| 3,922,353 | 11/1975 | Bernotavicz | 426/283 |
| 3,934,043 | 1/1976 | Haas et al. | 426/283 |
| 4,162,333 | 7/1979 | Nelson et al. | 426/283 |
| 4,209,536 | 6/1980 | Dogliotti | 426/283 |
| 4,283,430 | 8/1981 | Doster et al. | 426/284 |
| 4,427,703 | 1/1984 | Schäfer et al. | 426/284 |

Primary Examiner—Jeanette M. Hunter
Attorney, Agent, or Firm—Cushman, Darby & Cushman

[57] ABSTRACT

A snack-type confectionary product is comprised of a hollow, substantially tubular body, made of extruded cooked biscuit with particular characteristics of lightness, crispness and digestibility, with the ends closed or open, stuffed with more or less fluid cream with or without grains and fruit, possibly covered with chocolate and grains of various kinds. A process is also provided for the production of the confectionary product described above, involving the high temperature extrusion cooking of said biscuit, as well as subsequent operational phases for completing the product.

10 Claims, 11 Drawing Figures

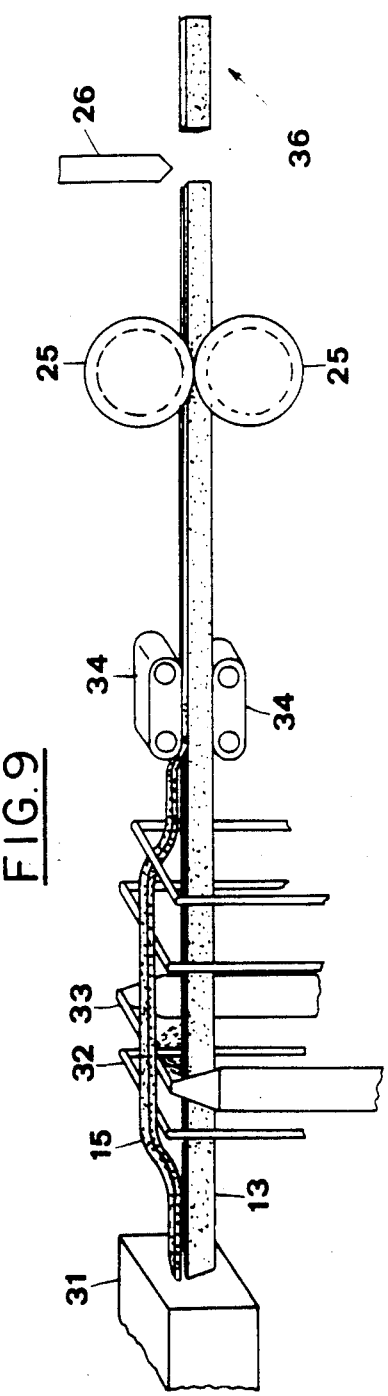
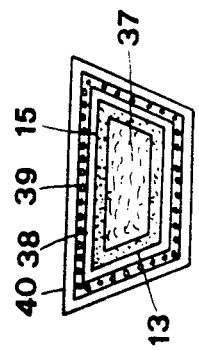
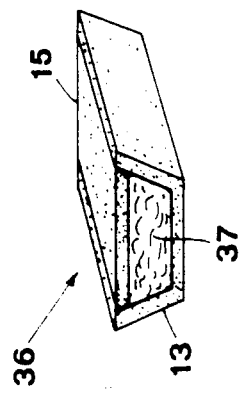

CONFECTIONARY PRODUCT AND PROCESS FOR PRODUCING THE SAME

Commercially available snack products may be divided into two large categories: sweet and salty.

The technologies used range from the classical (bread making, biscuit making, chocolate/sugar treatment, etc.) to the most modern (extrusion baking).

With regard to the latter process, the most significant products are based on corn starch, which is easily handled by these machines, more or less expanded and more or less flavoured, for example cipsters.

Sweet snacks generally consist of biscuit or wafer with or covered by cream and/or chocolate, with or without grains or oleaginous seeds or cereals and with a degree of crispness dependent on the quantity of biscuit/wafer/grain used for any given recipe.

The confectionary product according to the present invention has analogous characteristics with regard to the external or covering parts but, unlike existing products, comprises a hollow, substantially tubular body of extruded biscuit, in which even fluid cream may be placed, and which can be closed without using sealing materials, such as chocolate for example.

Said hollow body of biscuit is produced by means of cooking-extrusion in a continuous tubular shape comprising one or more parts with a higher degree of expansion than similar commercially available products and in any case controllable through the pressure difference between the inside and the outside of a die of given shape.

This type of embodiment allows both the desired degree of crispness along the entire surface as well as the desired appearance (volume/weight ratio) to be achieved, with the advantage of also being able to hold a fluid cream by virtue of its reclosability.

In particular the present invention relates to a snack-type confectionary product comprising a cooked extruded "biscuit", shaped in various hollow, substantially tubular geometric shapes, of one or more components, open or closed on the ends, with an internal filling which may be doughy, creamy or fluid at room temperature, with or without the addition of grains or fruit, covered if desired with chocolate and grains of various types, such as toasted or puffed cereals, oleaginous seeds, etc.

The principal characteristic of the product according to the invention lies in the biscuit which, due to the technology used, is light, crisp, and digestable as well as mouldable in a wide variety of geometric shapes.

This facility in making the most varied geometry arises from two facts: the first is strictly related to the shape of the die through which the biscuit cooked mixture is passed, and the second is that at the outlet of the die the extruded cooked biscuit has a very high temperature between 85° and 110° C. At this temperature the starch in the flours in the mixture in almost completely gelatinized (at least 80%) and therefore renders the mass strikingly plastic and mouldable.

A combination of the geometric effects related to the shape of the die with the immediate expansion of the product at the outlet of the die due to the difference in pressure between the inside and outside of the extruder and with the plasticity of the mass, which may thus be lengthened, widened, flattened, or cut, allows the formation of a hollow, substantially tubular body of one or more elements, with walls of a definite thickness which, when suitably cooled, become hard and crisp.

The moisture content of the product so prepared is no greater than 8%, and is preferably between 3% and 6%.

Before the biscuit prepared in this way cools and assumes its definitive shape, a filling cream is poured inside it with a moisture content no greater that 4% (and the moisture of the biscuit in any case) and with a water activity ($a_w$) less than 0.65 at 20° C.

Depending on the types of fat material used (oils or fats) and the other ingredients in the formula, the filling cream may range at room temperature from doughy to fluid.

In the former case the geometric shape of the biscuit may be substantially tubular with no closing at the ends, while in the latter case it is preferable to close the ends to prevent the cream from coming out, utilizing the plasticity of the biscuit at the high temperature used.

After cooling, the product may be packaged directly as it is, or it may be subsequently covered with chocolate and grains of various types, for example, toasted or puffed cereals, oleaginous seeds, candied fruit, etc., and after further cooling, packaged.

The present invention also relates to a process for producing the confectionary product described above comprising extrusion of the provided mixture at high temperature through a suitable die to prepare said cooked biscuit, as well as subsequent steps of completion and finishing specified in more detail below.

The present invention will be illustrated more clearly in the description of its embodiment, shown in an exemplificative and non-limiting fashion, in conjunction with the attached drawings, in which:

FIG. 9 is a schematic view of the operational steps in the preparation of the product according to the invention from biscuit with two components formed with the third die in FIG. 5;

FIG. 10 is an enlarged prospective view of the product according to the invention as it is obtained at the end of the operational steps in FIG. 9; and FIG. 11 is an enlarged cross section view of the product according to the invention as obtained at the end of the operational steps in FIG. 9, completed with subsequent finishing steps.

FIGS. 1, 3 and 5 show some examples of steps for the extrusion of a substantially tubular shaped biscuit with one or more components, comprising, as evident from the above description, the base element of the confectionary product according to the present invention.

Figure 1:
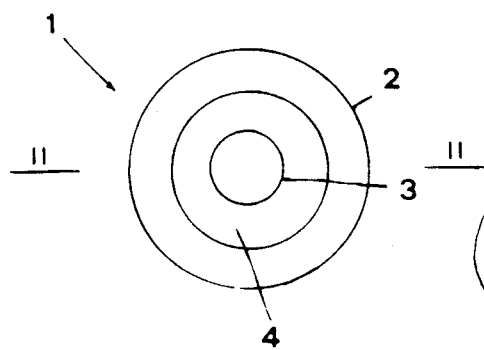
FIG. 1 is an elevation view of the outlet end of a first die for the execution of one shape of biscuit for the confectionary product according to the invention.
Figure 2:
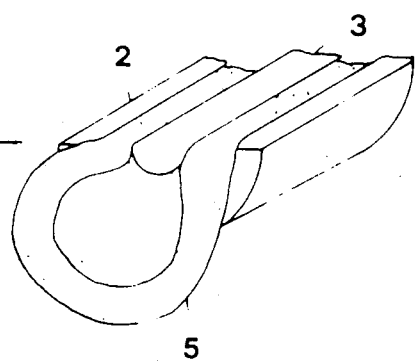
FIG. 2 is a perspective view of the longitudinal section along the II—II line of FIG. 1 in which the formation of the corresponding part of the biscuit is shown.

In particular, FIG. 1 shows a first die indicated generically with 1, comprising a hollow cylindrical body 2 inside of which a cylinder 3 is axially positioned in such a way as to create a circular, annular crown 4, through which the provided biscuit mixture is extruded to obtain a cooked tubular cylindrical biscuit 5, as shown in an incomplete form in FIG. 2.

Figure 3:
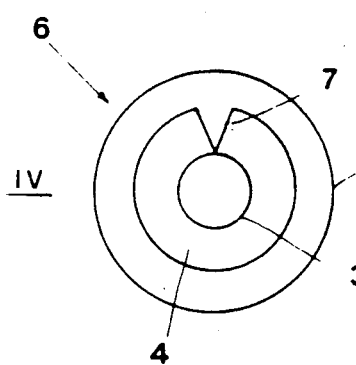
FIG. 3 is an elevation view of the outlet end of a second die for the formation of another shape of biscuit for the confectionary product according to the invention.

FIG. 3 refers to a second drawing machine indicated generically with 6, for the purposes described above, made substantially as die 1 in FIG. 1, for which the same reference numbers are used to indicate the same components with no further illustration, with the addition of a wedge-shaped element 7 attached to the internal face of the hollow cylindrical body 2 at the upper generatrix lying on the median longitudinal vertical plane.

Figure 4:
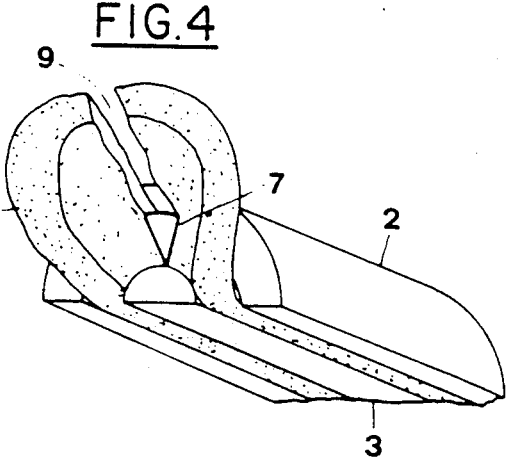
FIG. 4 is a perspective view of the longitudinal section along line IV—IV of the die in FIG. 3 in which the formation of the corresponding part of the biscuit is shown.

Die 6 makes a biscuit 8, shown partially in FIG. 4, similar to that obtained with die 1 but with an upper split 9 along its entire length.

Figure 5:
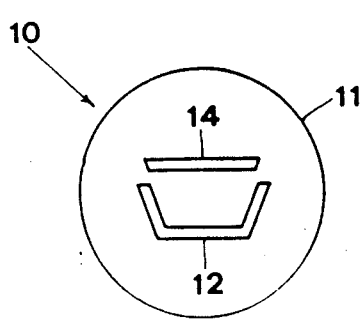
FIG. 5 is an elevation view of the outlet and of a third die for the formation of a third biscuit with two components for the confectionary product according to the invention.

FIG. 5 shows a third die, indicated generically with 10, for forming a substantially tubular biscuit with two components.

Figure 6:
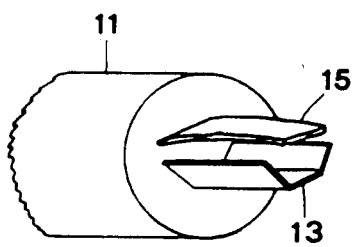
FIG. 6 is a prospective view of the die in FIG. 5 showing the formation of the relative biscuit with two components.

Die 10 comprises a cylinder 11 in which there are two separate and distinct axial longitudinal cavities shaped so that a tray element 13 may be extruded from the first cavity 12 with a trapezoidal cross section (see FIG. 6), while a flat strip element may be extruded from the second cavity 14 (see FIG. 6) which can act in the operational step as a cover for said tray element 13 so as to form the intended tubular body.

Figure 7:
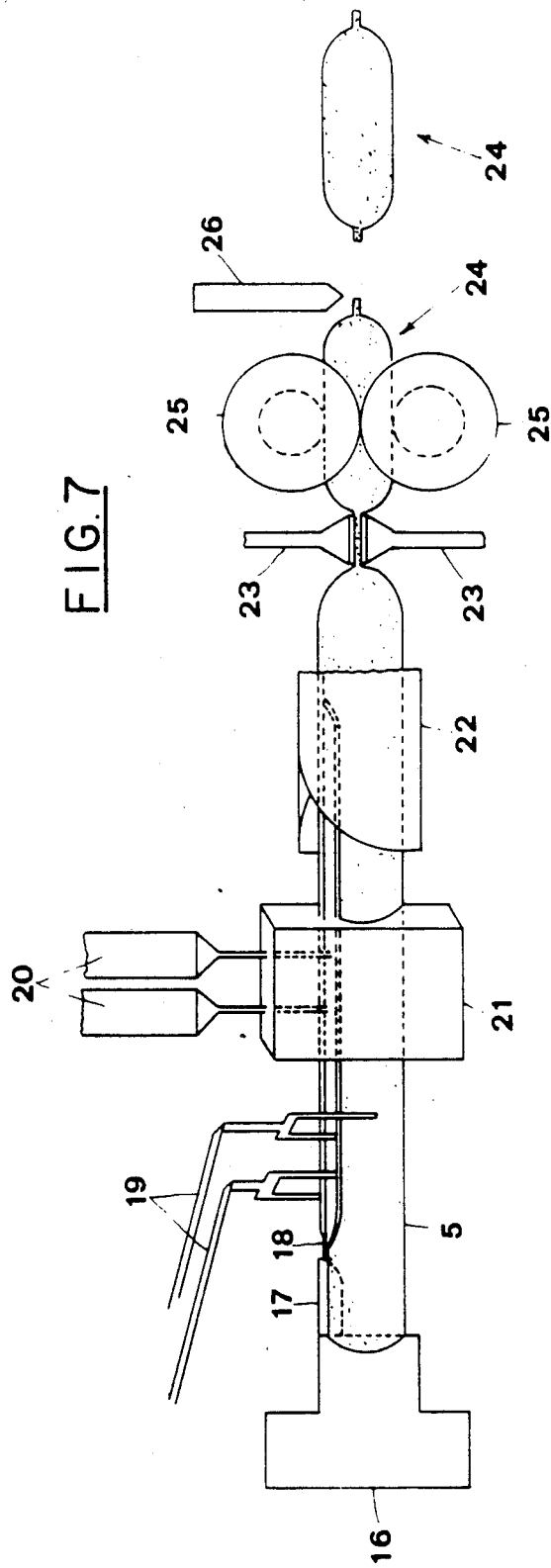
FIG. 7 is a schematic view of the operational steps in the preparation of the product according to the invention from the biscuit formed with the first die in FIG. 1.

FIG. 7 graphically illustrates the subsequent operational steps according to a continuous cycle of a first example of a process for preparation of the confectionary product according to the present invention, using die 1 of FIG. 1 for extrusion of the tubular cylindrical biscuit 5.

In this FIG. 7, an extruder is indicated with 16 in which is mounted said die 1 (not shown) through which the biscuit mixture is passed and cooked for the formation of said cooked tubular cylindrical biscuit 5, which at the outlet of extruder 16 has as mentioned a very high temperature of 85° to 110° C. so as to make it plastic and mouldable.

Attached on top to the outer face of the head of the extrudor 16 is a cutting blade 17 placed so as to form a split 18 along the top generatrix of the outcoming biscuit 5. Just downstream the blade 17 there is a pair of spreaders 19 which widen split 18 to allow the filling cream to be put by the volumetric batchers 20 into the inside of the tubular biscuit 5 as it moves through a precooling chamber 5 with air jets from suitably positioned nozzles (not shown) so that in a few seconds (5-20) the temperature of the biscuit 5 is brought to 55°-70° C.

The filled biscuit 5 then passes through a throttled wedge device 22 which closes and seals the pulled apart edges of the split 18 and then to a flattening device 23 which acts transverse to the direction in which the filled biscuit 5 advances to close the ends of each piece, which form the confectionary product in question indicated generically with 24, without however separating them. They therefore can be advanced further by sizing rollers 25 arranged to pull along under tension the cooked and filled extruded biscuit 5 which, in the mean time, has assumed a stable form after cooling completely.

At the outlet of rollers 25, a cutter 26 cuts the individual pieces 24 of the product at the midpoint of the flattened areas.

Figure 8:
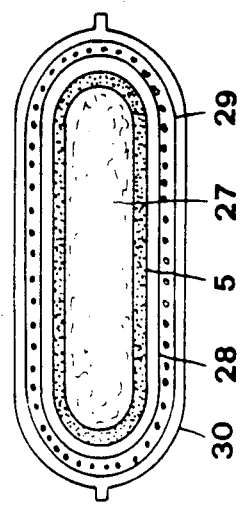
FIG. 8 is an enlarged, longitudinal section view of the product according to the invention prepared in the operational steps shown in FIG. 7, completed with subsequent finishing steps.

The product so prepared may be used as is, or preferably, may be subjected to further steps in which, as shown in FIG. 8 where 27 indicates the filling cream, it is covered using conventional systems with a first layer 28 of melted chocolate, a second layer 29 of grains of puffed/toasted cereals, oleaginous seeds, dried and/or candied fruit, and 30 of melted chocolate, as well as a covering of cocoa, with a brief final cooling to consolidate the above mentioned layers.

FIG. 9 shows graphically the successive operational steps according to a continuous cycle of a second example of a process to prepare the confectionary product according to the present invention, using the die 10 shown in FIG. 5 for extrusion of a biscuit with two components, comprising biscuit cooked as it is the tray element 13 and the flat cover strip 15.

In this figure, an extruder is indicated with 31 in which the die 10 of FIG. 5 is mounted (but not shown); the cooked mixture is passed through its longitudinal cavities 12 and 14 and simultaneously form a tray 13 and a cover 15, which come out of the extruder head contemporaneously, but distinctly and separately, and, as mentioned for the first process example, at such a temperature as to make them doughy and mouldable.

Downstream the extruder 31, the biscuit cover 15 is carried over supports 32 raised so as to distance it from the biscuit tray 13 so that the latter may be filled with the provided cream by a batcher apparatus 33 equipped with a feed pump.

The cover 15 is then gradually lowered so that it meets the top of the filled tray 13.

The precooling to reduce the temperature of the biscuit to the range of values cited in the first process example occurs by means of compressed air coming out of openings (not shown) suitably placed in elements 32,34.

As in the first case, sizing rollers 25 are provided to move the two component biscuit in question along; said biscuit has in the meantime assumed a stable shape upon complete cooling. A cutter 26 downstream said rollers 25 separates the individual pieces of the confectionary product according to the invention, which is indicated generically with 36 and shown in FIG. 10, where the filling cream is indicated with 37.

Product 36 may be packaged as it is, obviously where the filling cream is of a doughy consistency, or may undergo the same additional treatment already described for product 24 that is, as shown in FIG. 11, it may be covered with a first layer 38 of melted chocolate, a second layer 39 of grains of puffed/toasted cereals, oleaginous seeds, dried and/or candied fruit, and a third layer 40 of melted chocolate, as well as a covering of cocoa, with a brief final cooling to consolidate the above mentioned layers.

When the filling cream 37 is fluid in consistency, the product 36 may be closed at the ends using the same flattening system previously described with reference to FIG. 7 before being separated using the cutter 26.

The extruded cooked biscuit according to the present invention is characterized by a shape defined by the type of die used and by the subsequent operations of shaping and cutting, as well as by a striking crispness imparted by the particular cooking/extrusion process used.

The type of cooker-extruder chosen (co-penetrating double screw) allows production of typical baked products, for example, biscuits.

In other machines of this type it is not possible to use complex compositions which involve the use of flours, fats and sugars in high percentages.

The following formula is reported below as an example, for the production of the biscuit in question; the percent composition is:

| | |
|---|---|
| flours, also whole grain | 50-75 |
| sugar | 5-30 |
| fats/oils | 2-7 |
| powdered egg | 2-7 |
| powdered milk | 2-7 |
| powdered malt | 2-5 |
| salt | 1-2 |
| flavours | as needed |
| water | as needed |

The moisture content of the final product ranges from 2-8% depending on the desired cooking degree assuring the product a high degree of crispness even for the higher moisture values.

Traditional commercial biscuits have the desired degree of crispness substantially because of the alveolar structure (or rising) obtained by using yeasts, in particular chemical yeasts.

The biscuit which is the base of the confectionary product according to the present invention does not use an ingredient like yeast for said rising, but rather a physical principle such as the difference in pressure between the inner and outer parts of the die of a double screw copenetrating extruder, which due to its particular mechanical structure allows treatment of recipes of the type exemplified above, characterized by the absence of yeasts, chemical yeast in particular, by little water, and by little fat.

With regard to the filling cream, it may vary widely both in composition (organoleptic aspects) and in chemicophysical properties (rheological aspects).

Examples are given below to show the principal elements which distinguish three different types of cream to be used in filling the biscuit according to the present invention.

(1) Example of a "doughy" cream

| Percent composition: | |
|---|---|
| water emulsion of sugar and milk proteins | 25-35 |
| concentrated sucrose syrup | 15-25 |
| milk proteins | 7-15 |
| powdered skim milk | 5-15 |
| concentrate milk | 5-15 |
| sugar | 5-15 |
| flavours and lecithin | qs |

The water content of this cream is between 5 and 10%, and the water activity is between 0.50 and 0.65 at 20° C.

(2) Example of a "creamy" cream

| Percent composition: | |
|---|---|
| vegetable oil/fat | 20-35 |
| raisins/candied fruit | 15-20 |
| sugar | 10-20 |
| grains of oleaginous seeds | 10-20 |
| puffed/carmelized cereals | 5-10 |
| ground toasted hazelnuts | 5-10 |
| cocoa liquor | 5-10 |
| cocoa/cow's butter | 2-5 |
| powdered skim milk | 0-2 |
| flavours/lecithins | qs |

The water content of this cream is between 2 and 5%, and the water activity is below 0.5 at 20° C.

(3) Example of a "fluid" cream

| Percent composition: | |
|---|---|
| sugar | 35-45 |
| vegetable oil/fat | 35-45 |
| powdered milk | 10-20 |
| ground oleaginous | 5-10 |
| flavours/lecithins | qs |
| moisture % < 1%; $a_w$ < 0.4. | |

The present invention is not limited to the embodiments described.

We claim:

1. Confectionary product comprising an extruded cooked biscuit having a moisture content not over 8% in a continuous substantially tubular shape, filled with cream, said product having a crispy/creamy organoleptic effect, said product having been obtained by passing a mixture of a yeastless starch-containing biscuit composition through an extruder at a high temperature of between 85° and 110° C., said extruder having a die, said die having a difference in pressure between the inside and the outside of said die thereby providing said biscuit of substantially tubular shape with a high degree of crispness at moisture contents of 6-8%, said biscuit having a high degree of digestibility due to at least 80% gelatinization of the starch in composition due to said high temperature of said mixture, said extruder having means for and providing an opening in said biscuit during extrusion, thereafter filling said opened biscuit with a cream filling while simultaneously cooling said extruding biscuit, and subsequently closing said opening.

2. Confectionary product according to claim 1, wherein said biscuit is extruded in a single piece in said substantially tubular shape.

3. Confectionary product according to claim 1, wherein said biscuit is extruded in at least two separate and distinct elements which can be joined together so as to obtain said substantially tubular shape.

4. Confectionary product according to claim 1, wherein said biscuit filled with said cream has the ends open.

5. Confectionary product according to claim 1, wherein said biscuit filled with said cream is closed at the ends.

6. Confectionary product according to claim 1, wherein said biscuit filled with said cream is covered with layers of chocolate and grains of cereal, oleaginous seeds, dried and/or candied fruit.

7. Confectionary product according to claim 1, wherein said cream filling said biscuit is of a doughy, creamy or fluid consistency at room temperature, with or without grains.

8. Process for producing a confectionary product, comprising the steps of: continuously extruding through a suitable die a yeastless, starch-containing biscuit mixture at a temperature of between 85° and 110° C. to cook said mixture while making it plastic and malleable, placing a cream filling in said biscuit through a suitable opening which is made while said biscuit is passing through said die or obtained by cutting means at the outlet of the die and simultaneously cooking; said filled biscuit, closing said opening and closing or not the ends of the filled biscuits as they continue to be carried forward under tension; and cutting the filled biscuit confection into individual pieces.

9. Process according to claim 8, further comprising the step of putting a surface covering on each individual piece of product with successive layers of chocolate and grains.

10. A confectionary product according to claim 1 wherein the biscuit is made from a composition consisting essentiallly of

|  | % |
| --- | --- |
| flour | 50–75 |
| sugar | 5–30 |
| fats/oils | 2–7 |
| powdered egg | 2–7 |
| powdered milk | 2–7 |
| powdered malt | 2–5 |
| salt | 1–2 |
| flavours | as needed |
| water | as needed | the moisture content of the final product ranging from 2–8%.

* * * * *